US006253706B1

(12) United States Patent
Sloop

(10) Patent No.: US 6,253,706 B1
(45) Date of Patent: Jul. 3, 2001

(54) WILD BIRD FEEDER

(75) Inventor: Conrad B. Sloop, Pittsford, NY (US)

(73) Assignee: Gold Crest Distributing, Inc., Mexico, MO (US)

( * ) Notice: Subject to any disclaimer, the term of this patent is extended or adjusted under 35 U.S.C. 154(b) by 0 days.

(21) Appl. No.: 09/439,444

(22) Filed: Nov. 15, 1999

Related U.S. Application Data
(60) Provisional application No. 60/109,321, filed on Nov. 20, 1998.

(51) Int. Cl.[7] .................................................... A01K 39/01
(52) U.S. Cl. ........................................ 119/57.9; 119/52.3
(58) Field of Search .................................. 119/57.9, 57.8, 119/52.1, 52.2, 52.3, 469, 468; D30/124, 128

(56) References Cited

U.S. PATENT DOCUMENTS

| | | | |
|---|---|---|---|
| 1,520,607 | * | 12/1924 | Smith . |
| 2,583,203 | * | 1/1952 | Bergeron . |
| 2,591,459 | * | 4/1952 | Meany . |
| 4,144,842 | * | 3/1979 | Schlising ................. 119/52 |
| 4,732,112 | * | 3/1988 | Fenner et al. ............ 119/52 |
| 5,269,242 | * | 12/1993 | Toldi .................... 119/52.2 |
| 5,558,040 | * | 9/1996 | Colwell et al. ........ 119/52.2 |
| 5,568,789 | * | 10/1996 | Koenig et al. ......... 119/57.9 |
| 6,119,627 | * | 9/2000 | Banyas et al. ......... 119/57.9 |

* cited by examiner

Primary Examiner—Charles T. Jordan
Assistant Examiner—Yvonne R. Abbott
(74) Attorney, Agent, or Firm—Greenwald & Basch LLP; Howard J. Greenwald

(57) ABSTRACT

A wild bird feeder with a transparent seed hopper, a skirt below the seed hopper, a base beneath the skirt, and a device for connecting the base and the skirt while maintaining a feeding gap between the base and the skirt. The feeding gap is formed by a top surface and a bottom surface, and the skirt contains a downwardly extending lip which extends downwardly at least to the top surface of the feeding gap.

6 Claims, 6 Drawing Sheets

WILD BIRD FEEDER

CROSS-REFERENCE TO RELATED PATENT APPLICATION

Priority for this patent application is based upon applicant's copending provisional application No. 60/109,321, filed on Nov. 20, 1998.

FIELD OF THE INVENTION

A wild bird feeder that is so constructed that rain and snow cannot enter the feeding port and the seed within the feeder stays dry.

BACKGROUND OF THE INVENTION

Wild bird feeders are well known to those skilled in the art. By way of illustration, U.S. Pat. No. 3,372,676 of Robert H. Williams et al. discloses a bird feeder which excludes sparrows from feeding but allows cardinals to feed.

The bird feeder of the Williams et al. patent, and other prior art bird feeders, do not invariably prevent rain and/or snow from entering the feeding trough of the feeder.

It is an object of this invention to provide a wild bird feeder which invariably prevents rain and/or snow from entering the feeding area of the feeder.

It is another object of this invention to provide a wild bird feeder which is vented so that moisture does not accumulate inside its seed hopper.

It is another object of this invention to provide a wild bird feeder which allows viewers substantially greater visibility of the feeding birds than prior art feeders.

SUMMARY OF THE INVENTION

In accordance with this invention, there is provided a wild bird feeder comprised of a seed hopper with transparent walls, a roof disposed on top of said seed hopper, wherein at least one vent gap exists between said roof and said seed hopper, means for connecting said roof to seed hopper, a skirt disposed beneath said feed hopper, a base disposed beneath said skirt, and at least one feeding gap exists between said base and said skirt.

BRIEF DESCRIPTION OF THE DRAWINGS

The invention will be described by reference to this specification and the enclosed drawings, in which like numbers refer to like elements, and in which.

DESCRIPTION OF THE PREFERRED EMBODIMENTS

Figure 1:
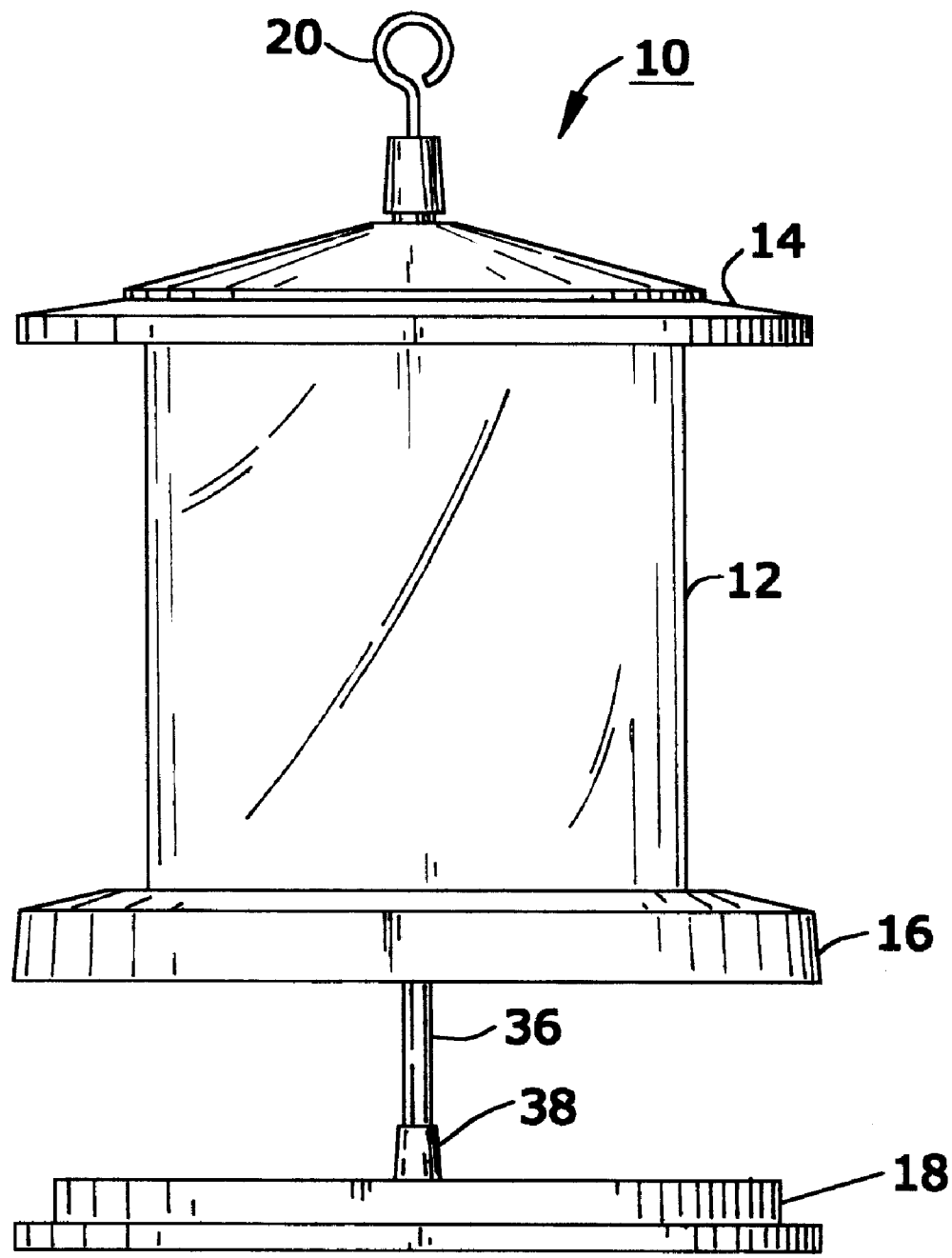
FIG. 1 is a perspective view of one preferred embodiment of the wild bird feeder of the invention.

FIG. 1 is a perspective view of a wild bird feeder 10 which is comprised of a seed hopper 12, a roof 14 disposed on seed hopper 12 and separated therefrom by a clamp (not shown), a skirt 16 disposed below seed hopper 12, a base (not shown in FIG. 1) disposed beneath skirt 16, and a perch 18 disposed beneath said base. In one embodiment, not shown, perch 18 is comprised of a multiplicity of drain holes.

In one embodiment, seed hopper 12 is made from a material which is transparent under normal conditions. In one preferred embodiment, hopper 12 is made from polycarbonate. One may use any commercially available polycarbonate such as, e.g., "Lexan" (a polycarbonate resin sold by the General Electric Company), "MRC PC100VHUV" (a ultraviolet-stabilized polycarbonate sold by the MRC Company), and the like. The preferred polycarbonate is transparent (i.e., it has at least about 90 percent light transmission), noncorrosive, weather and ozone resistant, non-toxic, and stain resistant.

In one embodiment, the hopper 12 is made from acrylic.

Referring again to FIG. 1, and in the preferred embodiment depicted therein, both the seed hopper 12 and skirt 16 consist essentially of polycarbonate.

Hanger 20 is connected to a rod (not shown), and it may be used to hang the feeder 10 from a pole (not shown) or a tree branch (not shown).

Figure 2:
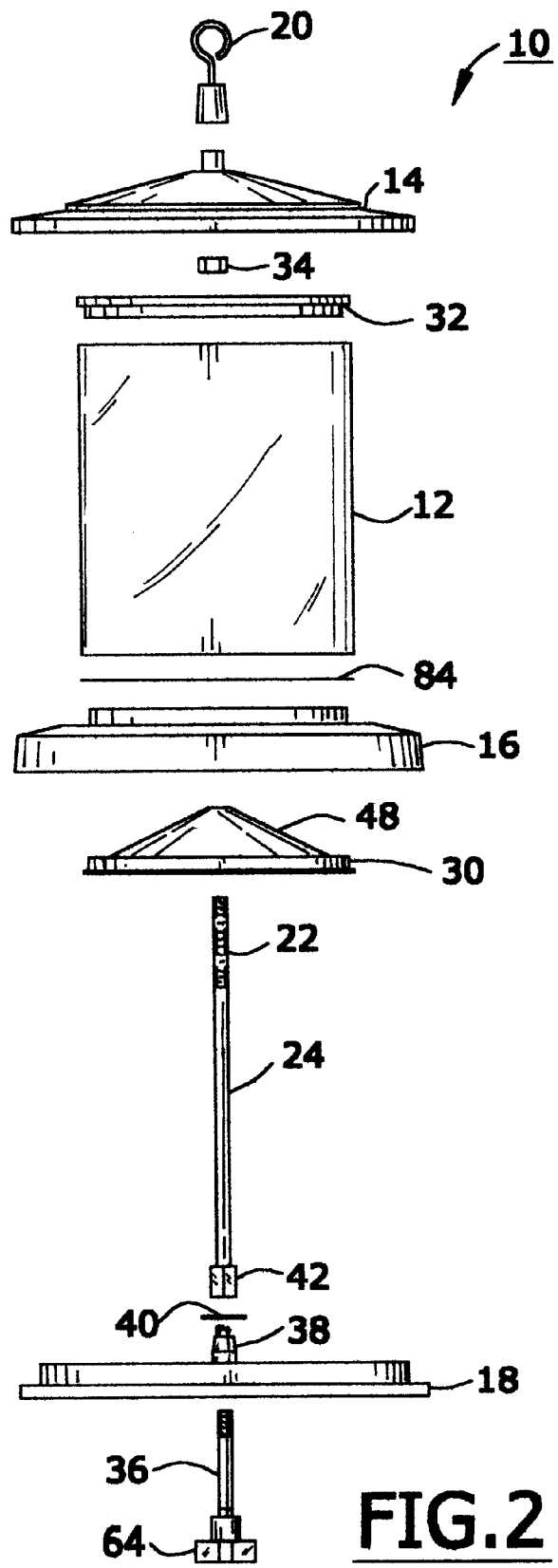
FIG. 2 is an exploded view of the bird feeder of FIG. 1.

FIG. 2 is a an exploded view showing one preferred construction of feeder 10. Referring to FIG. 2, it will be seen that hanger 20 is adapted to receive end 22 of rod 24 within an insert 26 (see FIG. 3) which contains female threads which engage the male threads on end 22. A rain trap 28 is disposed around insert 26.

Referring again to FIG. 2, the end 22 of rod 24 extends through orifices (not shown) in base 30, skirt 16, seed hooper 12, and nut 34. A second rod, lower rod 36, extends through an orifice (not shown) in perch 18, boss 38 integrally connected to perch 18, hairpin clip 40 into a coupler 42 comprised of an orifice (not shown) with internal threads (not shown) which coupler preferably has a hexagonal shape. In the preferred embodiment depicted in FIG. 2, the coupler 42 is integrally connected to rod 24, preferably being joined thereto by anaerobic adhesive. One suitable anaerobic adhesive is sold under the name of "LOCTITE" by the Loctite Corproation of Newington, Conn. As is known to those skilled in the art, these anaerobic polymers retain liquid while exposed to air and automatically harden without heat or catalysts when confined between closely fitting metal parts.

Figure 3:
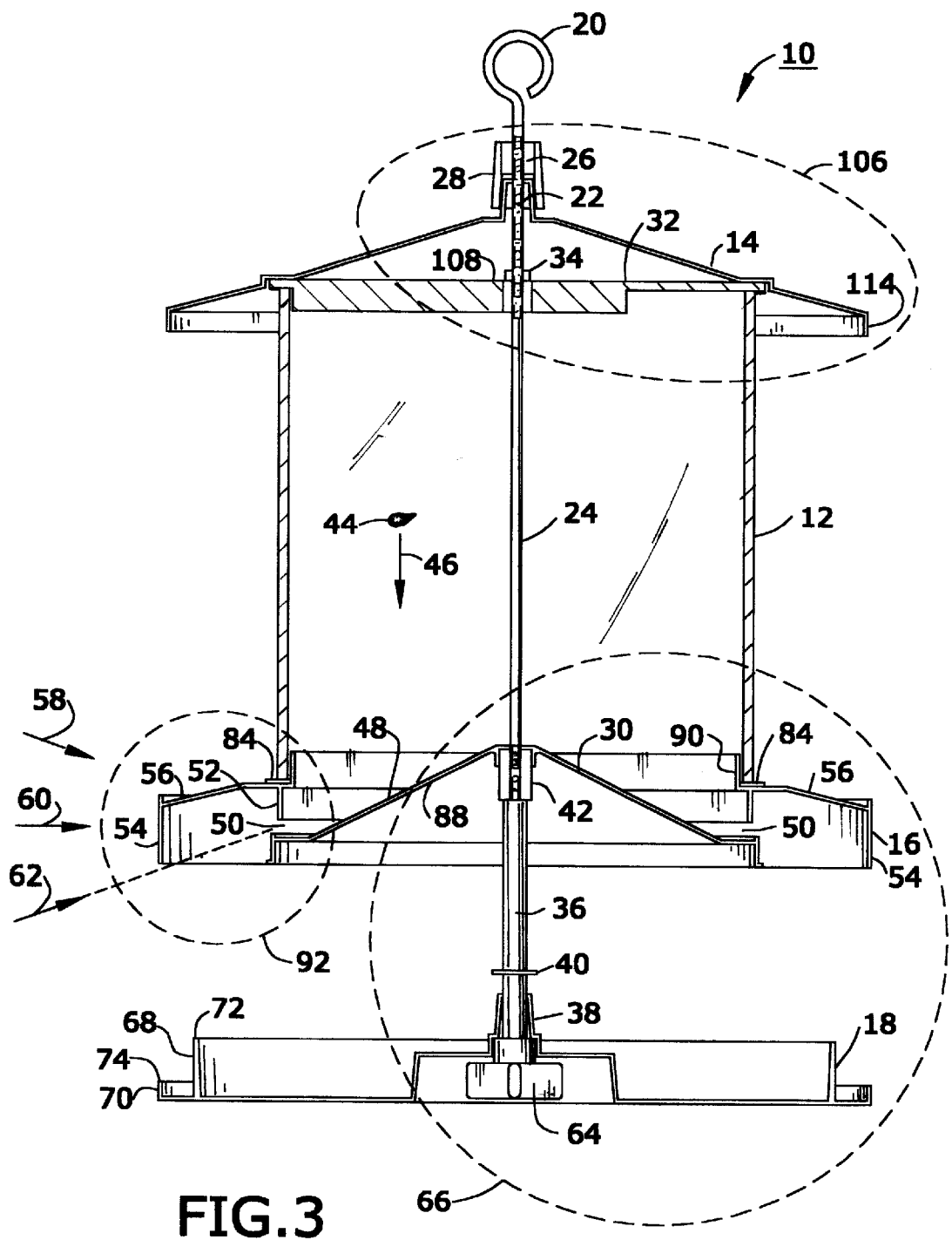
FIG. 3 is a sectional view of the bird feeder of FIG. 1.

FIG. 3 is a sectional view of feeder 10. Referring to FIG. 3, and to a hypothetical grain of seed within seed hopper 12, it will be seen that seed grain 44 will be attracted by the force of gravity in the direction of arrow 46 until it contacts the inclined surface 48 of base 30 and falls towards gap 50. As will be discussed elsewhere in this specification, the seed grain 44 will sit within gap 50 until it picked out by a wild bird.

The gap 50 is preferably an annular gap, extending around at least about 90 per cent of the periphery of the downwardly extending flange 52 of skirt 18. One may use conventional means, such as upstanding ribs 51 (see FIG. 4A, which illustrates the interaction between upstanding ribs 51 and downwardly extending fork 53) integrally formed on the top surface of base 18, to separate the base 18 from the flange 52 on the skirt 16 to form gap 50. In one embodiment, flange 52 contains downwardly extending forks 53 to engage the upstanding ribs 51 and to prevent rotation between the skirt 16 and the base 30. Other means of preventing rotation between the skirt 16 and the base 30 also may be used.

Referring again to FIG. 3, it will be seen that the skirt 16 is comprised of a downwardly extending lip 54 which preferably is integrally connected with the inclined surface 56 of skirt 16. It preferred that downwardly extending lip 54 extend beneath gap 50 so that wind or rain driven in the direction of arrows 58, 60, and 62 cannot enter gap 50.

Referring again to FIG. 3, it will be seen that rod 36 is integrally connected to knob 64 by conventional means such as, e.g., adhesive means. In one embodiment, anaerobic adhesive is used to make such connection.

Figure 4:
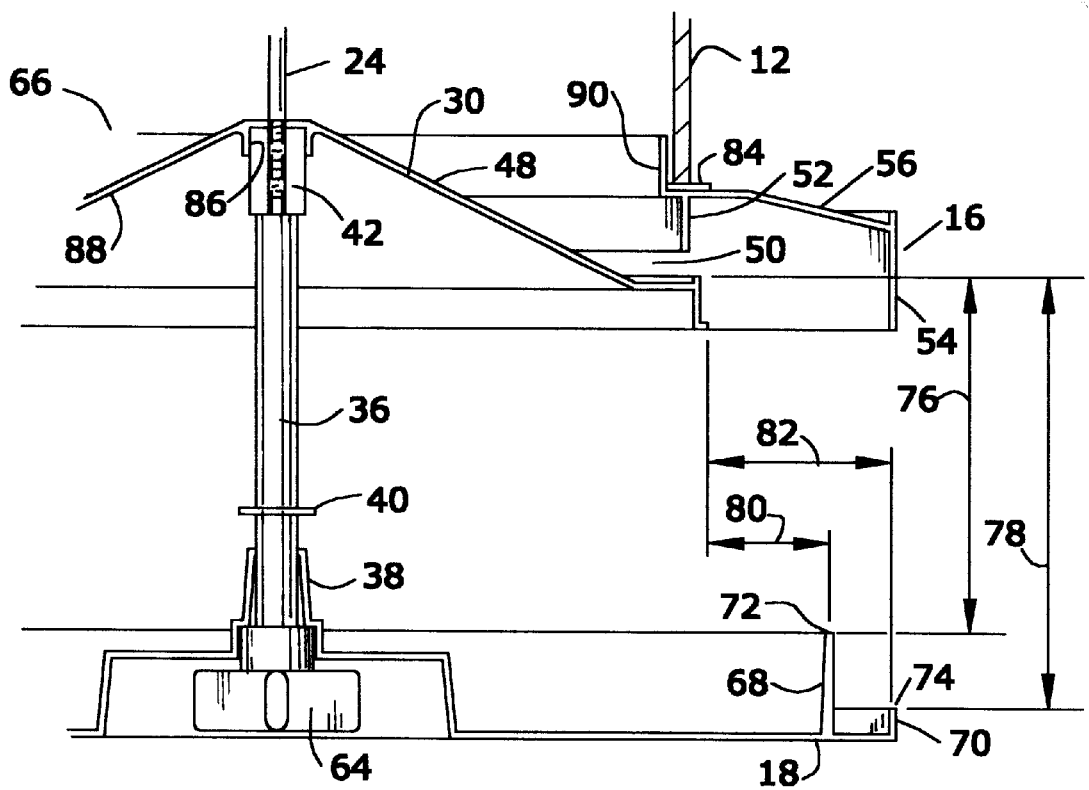
FIG. 4 is a partial sectional view of the bird feeder of FIG. 1.
Figure 4A:
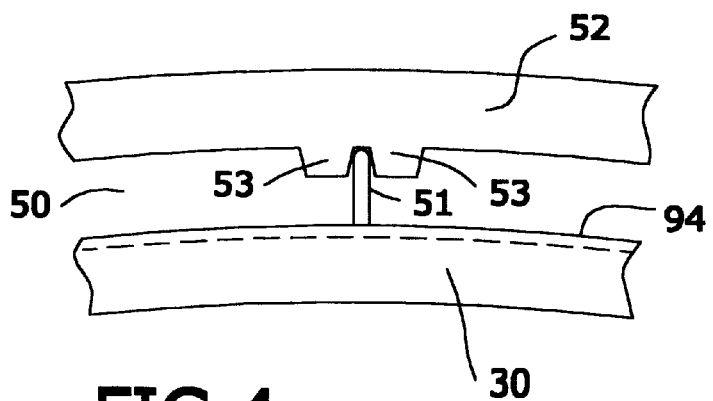
FIG. 4A is a partial sectional view showing a means of locking the base of the feeder to its skirt.

FIG. 4 is a partial sectional view of the portion 66 of bird feeder 10 depicted in FIG. 3. Referring to FIG. 4, it will be seen that perch 18 is adapted to accommodate both small and large birds, such as, e.g., small goldfinch and large cardinals. The perch 18 is preferably comprised of upstanding circular flanges 68 and 70. The smaller birds can stand on the top 72 of flange 68; the larger birds can stand on the top 74 of flange 70; and both flange 68 and 70 are so dimensioned that both the smaller and larger birds can reach the seed (not shown) within seed gap 50.

In one embodiment, the vertical distance 76 between the top 72 of flange 68 and the feed gap 50 is preferably from about 2.5 to about 3.3 inches, and the vertical distance 78 between the top 74 of flange 70 and the feed gap 50 is from about 3.5 to about 4.5 inches. The horizontal distance 80 between the top 72 of flange 68 and the and the feed gap 50 is from about 0.5 to 1.3 inches, and the horizontal distance 82 between the top 74 of flange 70 and the feed gap 50 is from about 1.4 to about 2.5 inches.

Referring again to FIG. 4, and in the preferred embodiment depicted therein, it will be seen that hairpin clip 40 fits in a groove (not shown) formed in lower rod 36 to retain the lower rod 36 within perch 18.

An annular gasket 84 is disposed between feed hopper 12 and skirt 16. A hexagonal recess 86 is formed within the within the bottom surface 88 of base 30 receive hexagonal coupler 42. An upstanding flange 90, which preferably is annular, is integrally formed on the top surface of skirt 16 and is adapted to receive and align feed hopper 12.

Figure 5:
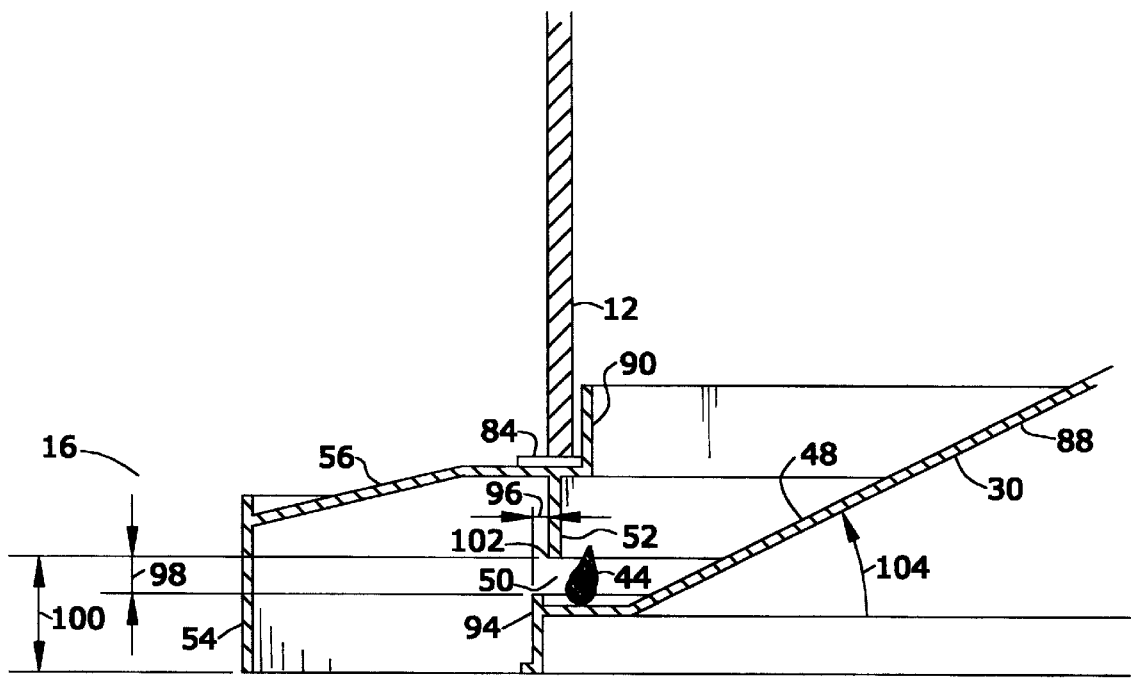
FIG. 5 is a partial sectional view of the feeding area of the bird feeder of FIG. 1.

FIG. 5 is partial sectional view of area 92 of FIG. 3. Referring to FIG. 5, and in the preferred embodiment disclosed therein, it will be seen that seed grain 44 is prevented from falling out of gap 50 by upstanding ledge 94, which is integrally formed with base 30. In the preferred embodiment depicted in FIG. 5, the upstanding ledge 94 offset from downwardly projecting flange 52 of skirt 16 by a distance 96 of from about minus –0.2 to about plus 0.2 inches. When the distance 96 is positive (to the right), such as plus 0.2 inches, the seed 44 will tend not to flow freely from gap 50. When the distance 96 is negative (to the left), such as minus 0.2 inches, the seed 44 will tend to flow freely from gap 50.

Referring again to FIG. 5, it will be seen that gap 50 has a width 98 of from about 0.08 to about 0.13 inches. Applicant has discovered that gaps outside of this range do not produce satisfactory results.

Referring again to FIG. 5, it will be seen that lip 54 of skirt 16 extends below the top 102 of gap 50 by a distance 100 of from about 0 to about 1.5 inches. In one embodiment, distance 100 is from about 0.5 to about 0.7 inches.

The inclined surface 48 forms an angle 104 of from about 20 to about 30 degrees to facilitate the flow of seed grain 44 from the center of the hopper 12 to the gap 50.

Figure 6:
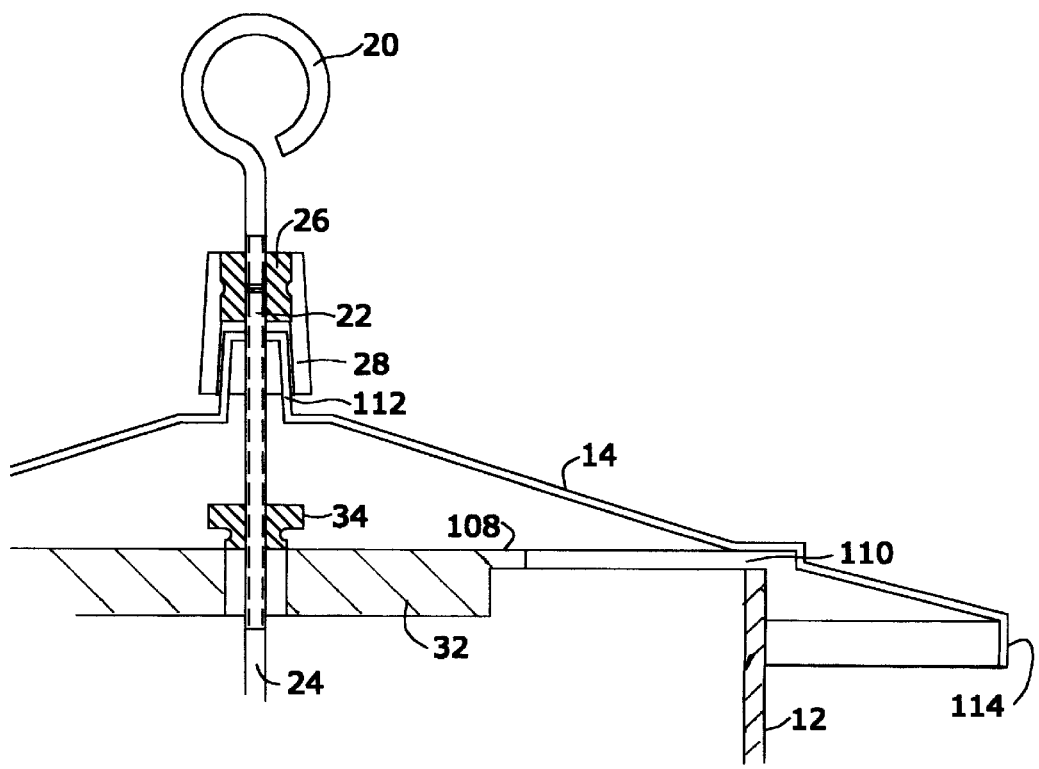
FIG. 6 is a partial sectional view of the roof area of the bird feeder of FIG. 1.

FIG. 6 is a partial sectional view of area 106 of FIG. 3, which shows the venting which preferably exists in applicant's feeder 10. Referring to FIG. 6, it will be seen that a clamp 32 which preferably contains three equally spaced radial arms. The top surface 108 of clamp 32 is so dimensioned that roof 14 is not contiguous with seed hopper 12 and, consequently, forms a vent gap 110 to allow moisture within the seed (not shown) to escape when heated by the sun. Applicant has discovered that this venting is critical to insure the seed grains do not decay prematurely. The vent gap 110 preferably is from about 0.06 to about 0.2 inches.

Referring again to FIG. 6, it will be seen that roof 14 is comprised of a boss 112 integrally connected thereto. In the preferred embodiment depicted, boss 112 extends upwardly inside of rain trap 28 to further prevent the entry of rain into seed hopper 12. In the preferred embodiment depicted, it will be seen that roof 14 is comprised of a downwardly extending skirt 114 which tends to prevent water from entering the vent gap 110.

Figure 7:
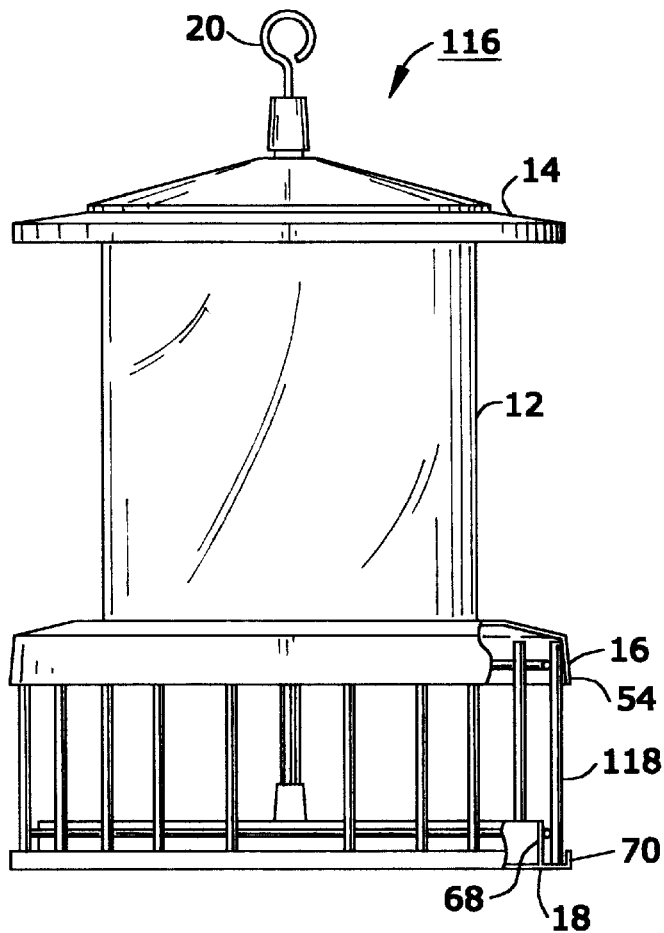
FIG. 7 is a perspective view of another preferred bird feeder of the invention.
Figure 8:
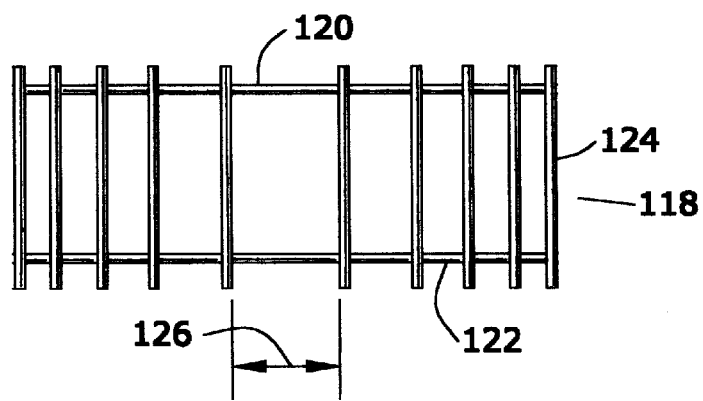
FIG. 8 is a perspective view of the squirrel cage used in the feeder of FIG. 7.

FIG. 7 illustrates a wild bird feeder 116 which is similar to bird feeder 10 but also contains a squirrel guard 118. The squirrel guard 118, which is designed to prevent squirrels from entering the feeder but allow birds to feed, is preferably a circular cage comprised of a top ring 120, a bottom ring 122, and a multiplicity of a vertical bars 124 joining the top ring 120 and bottom ring 122. In one embodiment, vertical bars 124 are spot welded to top ring 120 and bottom ring 122.

In one preferred, the vertical bars 124 are equally spaced around top ring 120 and bottom ring 122 and, thus, the distance 126 between adjacent bars is substantially constant. The distance 126 is critical: it must be below 1.5 inches (to prevent the entry of squirrels), and it must be above 1.2 inches to allow cardinals to enter. Thus, the distance 126 is preferably from about 1.25 to about 1.4 inches.

The squirrel guard 118 is preferably so dimensioned that its fits between flanges 68 and 70 on perch 18 and fits up under skirt 16, but inside flange 54.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. A wild bird feeder comprised of a transparent seed hopper, a skirt disposed below said seed hopper, a base disposed beneath said skirt, and means for connecting said base and said skirt while maintaining a feeding gap between said base and said skirt, wherein said feeding gap is formed by a top surface and a bottom surface, and wherein said skirt is comprised of a downwardly extending lip which extends downwardly at least to the top surface of said feeding gap, wherein said wild bird feeder is comprised of a perch disposed beneath and connected to said base, and wherein said perch is comprised of a first upstanding ridge and a second upstanding annular ridge whose height exceeds the height of said first upstanding annular ridge.

2. The wild bird feeder as recited in claim 1, wherein said perch is connected to said base by a rod extending through the center of said perch and said base.

3. The wild bird feeder as recited in claim 2, wherein said base is not contiguous with said perch.

4. A wild bird feeder comprised of a transparent seed hopper, a skirt disposed below said seed hopper, a base disposed beneath said skirt, and means for connecting said base and said skirt while maintaining a feeding gap between said base and said skirt, wherein said feeding gap is formed by a top surface and a bottom surface, wherein said skirt is comprised of a downwardly extending lip which extends downwardly at least to the top surface of said feeding gap, and wherein said base is comprised of a top section with a substantially conical shape.

5. The wild bird feeder as recited in claim 4, wherein said substantially conical shape of said top section of said base terminates in an upwardly extending ledge.

6. A wild bird feeder comprised of a transparent seed hopper, a skirt disposed below said seed hopper, a base disposed beneath said skirt, and means for connecting said base and said skirt while maintaining a feeding gap between said base and said skirt, wherein said feeding gap is formed by a top surface and a bottom surface, wherein said skirt is comprised of a downwardly extending lip which extends downwardly at least to the top surface of said feeding gap, wherein said wild bird feeder is comprised of a roof disposed over said transparent feed hopper, and wherein a rain trap is disposed over said roof.

* * * * *